United States Patent [19]

Ott

[11] 4,434,909
[45] Mar. 6, 1984

[54] PRESSURE COOKER INTERLOCK

[75] Inventor: Richrd B. Ott, Eau Claire, Wis.

[73] Assignee: National Presto Industries, Inc., Eau Claire, Wis.

[21] Appl. No.: 316,934

[22] Filed: Oct. 30, 1981

Related U.S. Application Data

[63] Continuation-in-part of Ser. No. 233,842, Feb. 12, 1981, abandoned.

[51] Int. Cl.³ .............................................. B65P 45/00
[52] U.S. Cl. .................................... 220/316; 220/293; 292/256.6; 277/11; 277/180
[58] Field of Search ............... 220/316, 319, 203, 293; 292/256.6; 277/11, 180

[56] References Cited

U.S. PATENT DOCUMENTS

| | | |
|---|---|---|
| 2,399,115 | 5/1946 | Hansen et al. |
| 2,600,703 | 6/1952 | Strom . |
| 2,600,714 | 6/1952 | Wenscott et al. |
| 2,623,657 | 12/1952 | De Vries . |
| 2,627,997 | 2/1953 | Wittenberg . |
| 2,707,118 | 1/1955 | Swartz et al. |
| 3,042,248 | 7/1962 | Krueger . |
| 3,973,694 | 8/1976 | Tess .................................... 220/316 |
| 4,024,982 | 5/1971 | Schultz . |
| 4,162,741 | 7/1979 | Walker et al. ...................... 220/316 |

| | | |
|---|---|---|
| 4,193,481 | 3/1980 | Wunderlich . |

FOREIGN PATENT DOCUMENTS

| | | |
|---|---|---|
| 538845 | of 0000 | Switzerland . |
| 571335 | of 0000 | Switzerland . |
| 708197 | of 0000 | United Kingdom . |

*Primary Examiner*—George T. Hall
*Attorney, Agent, or Firm*—Merchant, Gould, Smith, Edell, Welter & Schmidt

[57] ABSTRACT

A pressure cooker is disclosed having a safety interlock including a resilient gasket interposed between flat sealing surfaces of a receptacle and a cover, and configured to form a seal against the surfaces when they are spaced by a first distance, and to prevent formation of the seal when the surfaces are spaced by a second, smaller distance. The receptacle and cover are provided with interlocking lugs which are engageable in two different conditions to determine the first and second distances respectively. The gasket comprises an annular body having inwardly directed, axially diverging leg portions terminating in lip portions to seal against the sealing surfaces, and has faces with peripherally spaced bosses engageable by the sealing surfaces when at the second distance to decrease the divergence of the leg portions and so prevent seal formation. Y-shaped, V-shaped, and W-shaped cross sections for the gasket are shown.

17 Claims, 16 Drawing Figures

PRESSURE COOKER INTERLOCK

RELATED APPLICATION

This application is a continuation-in-part of my co-pending application Ser. No. 233,842, filed Feb. 12, 1981, now abandoned.

TECHNICAL FIELD

This invention relates to the field of pressure cookers, and more particularly to a cooker having special features of safety for protecting the user from burns resulting from inadvertent release of steam present within the cooker.

BACKGROUND OF THE INVENTION

One of the modern adjuncts to culinary processing in the home is the pressure cooker, usable to prepare food for the table and for preserving food by canning. Such a cooker conventionally consists of a vessel or receptacle having an open top through which water and material to be treated are loaded, the top being afterwards closed by a cover which is releasably sealed vaportight to the receptacle. This produces a closed container in which steam pressure develops upon application of heat to effect the cooking process, to result in a superpressure condition in which the steam pressure within the cooker exceeds the pressure ambient to the cooker.

Conventionally, the cover of such a cooker is provided with a vertical vent pipe on which loosely rests a weight to regulate the pressure developed in the cooker during the cooking process. Such cookers commonly also contain a pressure release plug, usually in the cover, which is designed to be ejected to relieve pressure within the cooker before it reaches a dangerous level.

It is known to provide the cover and the receptacle with circumferentially spaced lugs at their peripheries, which may be interengaged by relative rotation therebetween to produce a sealing engagement of the cover and receptacle against a resilient sealing ring or gasket, so as to effect the vapor-tight seal of the cooker which is requisite to pressure cooking or canning. Special lug configurations are known which produce the seal mechanically, and special configurations of sealing rings are known whereby the development of pressure in the closed cooker acts pneumatically to maintain the seal formation.

Pressure cookers including the described type are used by persons of varying skills and understandings of the operation of the pressure cooker, and who, on occasion, may incompletely or improperly secure the cover to the cooker body. Experience has indicated that a substantial risk exists that the cover may be blown from the cooker should the cover through carelessness or otherwise be incompletely locked to the cooker body. This could occur becuase, when closing the cover on the cooker, the cover lugs were imperfectly engaged beneath the receptacle lugs. A potential hazard also exists when an attempt is made prematurely to rotate the cover and remove it before the cooker pressure has been reduced to a safe level.

BRIEF SUMMARY OF THE INVENTION

The present invention provides a combination of cover structre, receptacle structure, and gasket structure which together enable the ready closure of the cooker into a locked condition from which it cannot be removed as long as there is significant steam pressure within the cooker, and which together prevent the formation of a seal unless and until the locked relation of cover and recpetacle has been fully achieved, all without the need for any interlocks requireing manipulation by the user.

More specifically, the invention comprises safety interlock apparatus for a pressure cooker including a receptacle and a cover, having annular sealing surfaces in juxtaposition, and an annular resilient gasket disposed between the sealing surfaces. The cover and receptacle are provided with interlocking lugs and the cover is rotatable with respect to the receptacle between a first position, in which the lugs are disengaged, to a second position, in which the lugs are fully locked. The gasket has oppositely disposed faces positioned between the sealing surfaces, and comprises an outer peripheral portion and upper and lower inwardly extending and diverging leg portions with inner peripheral sealing lip portions, spaced bosses being provided on the faces. The lugs are so constructed and arranged that in their second, fully interlocked condition the sealing surfaces are spaced by a first distance such that pressure within the cooker can force the leg portions apart with the sealing lip portions pressed into sealing engagement with the sealing surfaces, and at the same time rotation of the cover out of said second, interlocked position is prevented. During movements of the cover between the first and second positions, the lugs are engaged and means associated with at least selected ones of the lugs reduce the distance between the sealing surfaces to a second distance at which the sealing surfaces engage the bosses on the gasket to prevent a seal from forming.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals indicate corresponding parts of the several views.

DESCRIPTION OF THE PREFERRED AND ALTERNATE EMBODIMENTS

A pressure cooker 20 according to the invention is shown to comprise a receptacle 21, a cover 22, and a sealing gasket 23. In the embodiment shown, receptacle 21 has a pair of handles 24, but one handle could be used if so desired. The handles 24 are of suitable heat-insulating material and extend radially outward below receptacle rim 25, which is broadened to provide an annular, flat sealing surface 26 and has a plurality of peripherally spaced interlock lugs 27 extending radially outward beyond surface 26. At first peripheral ends interlock lugs 27 are provided with peripherally short body stop lugs 28 extending away from surface 26 a short distance. In the embodiment shown, each interlock lug 27 is provided with a body stop lug 28. However, fewer body stop lugs may be used without departing from the invention.

Cover 22 has a peripheral rim 31 integral with a skirt 32 of greater internal diameter than that of rim 25 including interlock lugs 27. Skirt 32 is provided with a plurality of inwardly directed interlock lugs 33 peripherally sized and spaced to pass through the spaces between interlock lugs 27 of receptacle 21. Adjacent to skirt 32, cover 22 has a flat, annular sealing surface 34 aligned or disposed in juxtaposition with surface 26 of receptacle 21. A plurality of handles 35 of heat insulating material are secured to skirt 32 by suitable fasteners 36, and a conventional pressure regulator 37 and pressure release plug 38 are also included in the cover. Again, one handle could be used instead of two on the cover and on the receptacle.

Indices 42 are provided on the upper surfaces of receptacle handles 24, and indices 43 are provided on the upper surface of cover rim 31, to facilitate initial engagement of the cover with the receptacle: an inturned stop 44 is formed in skirt 32 to limit initial rotation between receptacle 21 and cover 22 to a single direction. Stop 44 is formed in the skirt 32 in the embodiment shown, but other stop devices could be used which would perform the same function. For example, the stop 44 could be welded or otherwise secured to the receptacle.

Figures 6, 10:
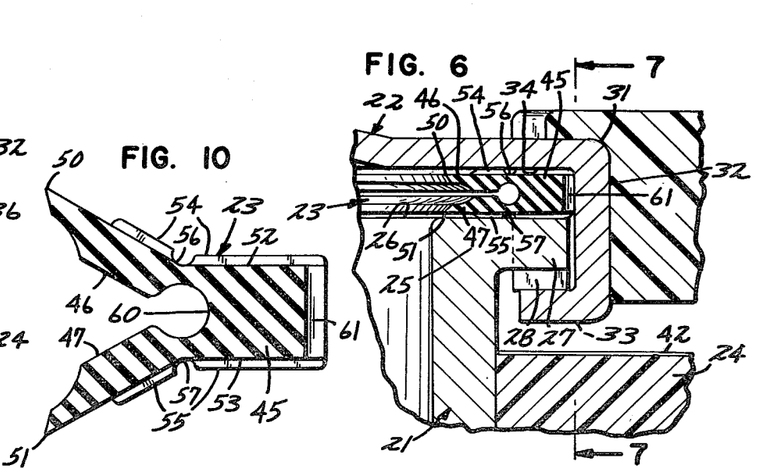
FIG. 6 is a fragmentary view like FIG. 4 taken along the line 4—4 of FIG. 2 showing the unlocked condition of the cooker.
FIG. 10 is a sectional view taken along the line 10—10 of FIG. 9.
Figure 8:
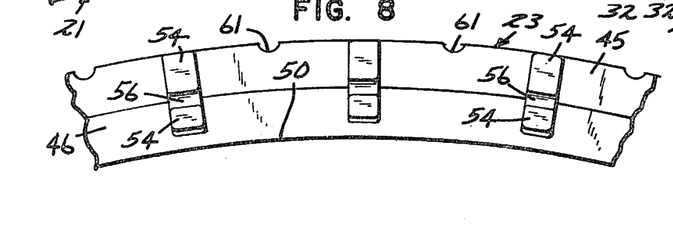
FIGS. 8 and 9 are fragmentary views in plan and elevation of a asket used in the invention.
Figure 9:
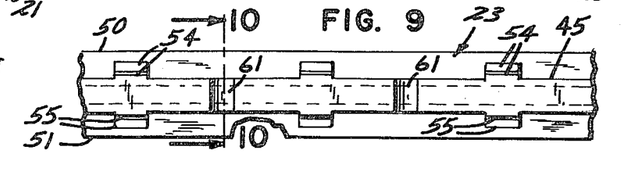

In this embodoiment gasket 23 is Y-shaped in radial section, and is shown in FIGS. 8-10 to comprise an annular body 45 of resilient material having diverging upper and lower inwardly directed leg portions 46 and 47 terminating in inner peripheral sealing portions comprising lip portions 50 and 51. In one model of this gasket, the body, excluding ribs, is 0.24 inches (0.6 cm) thick, and the relaxed gasket thickness is 0.513 inches (1.3 cm). The upper and lower surfaces of faces 52 and 53 of gasket 23 are provided with periperhally spaced aligned ribs or bosses 54 and 55. In the embodiment shown, the ribs are located on both the body 45 and on the leg portions 46 and 47 so that one or the other could not accidentally form a complete seal. The ribs are discontinuous at grooves 56 and 57 between the body and leg portions to increase the flexibility of leg portions 46 and 47, which is further enhanced by a circumferential groove 60 in body 45 between the leg portions.

Body 45 is provided with outer grooves 61 spaced between the ribs. Gasket 23 is of an outside diameter to fit within skirt 32 of cover 22, and is retained therein by interlock lugs 33. In all forms of gasket shown herein, including gasket 23, the gasket is symmetrically constructed so that it can be reserved without changing the operation. This facilitates cleaning of the unit and enhances safety because the gasket cannot be inadvertently installed in an improper relationship with the cover and receptacle. There are many variations on the gasket construction described, which would also accomplish the intended result of causing any pressure contained within the vessel to be released when the gasket 23 is compressed in thickness to some predetermined value. For example, the dimensions given have been somewhat arbitrarily chosen and any technically convenient values could be employed. Additionally the ribs or bosses 54 and 55 on the upper and lower surfaces of the gasket need not necessarily be aligned. Although it is preferable to have the ribs or bosses 54 and 55 on both the body 45 and the leg portions 46 and 47, the gasket would function properly and be within the scope of the invention if the ribs 54 and 55 were located only on one or both of the leg portions 46 and 47.

when cover 22 is placed on receptacle 21 with indices 43 aligned with indices 42, the interlock lugs 33 of the cover pass between the interlock lugs 27 of the receptacle, and gasket 23 is positioned at this time between surfaces 26 and 34. The resilience of the gasket, the spacing of leg portions 46 and 47, and the weight of the cover are such that sealing lip portions 50 and 51 engage the sealing surfaces sealingly. This first cover position is indicated by the broken lines in FIG. 2. However, no significant pressure rise in the receptacle can occur, even if the receptacle is inadvertently heated with regulator 37 in place: an incipient rise in pressure simply lifts the cover and the gasket slightly to enable steam to pass the gasket and escape from the receptacle all around its periphery.

Figure 1:
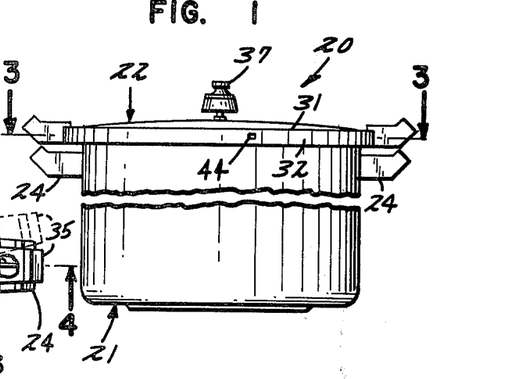
FIG. 1 is a view in elevation of a pressure cooker embodying the invetnion, shown in a locked condition.
Figure 2:
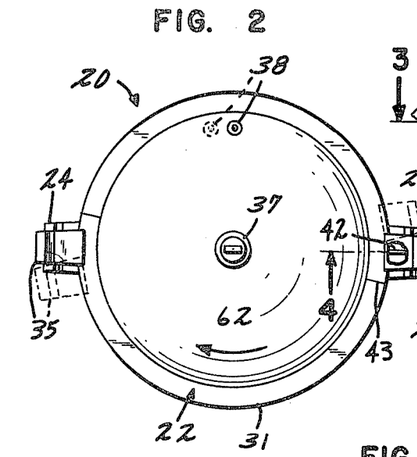
FIG. 2 is a plan view of the cooker of FIG. 1, shown locked in solid lines and unlocked in broken lines, parts being broken away for clarity of illustration.
Figure 3:
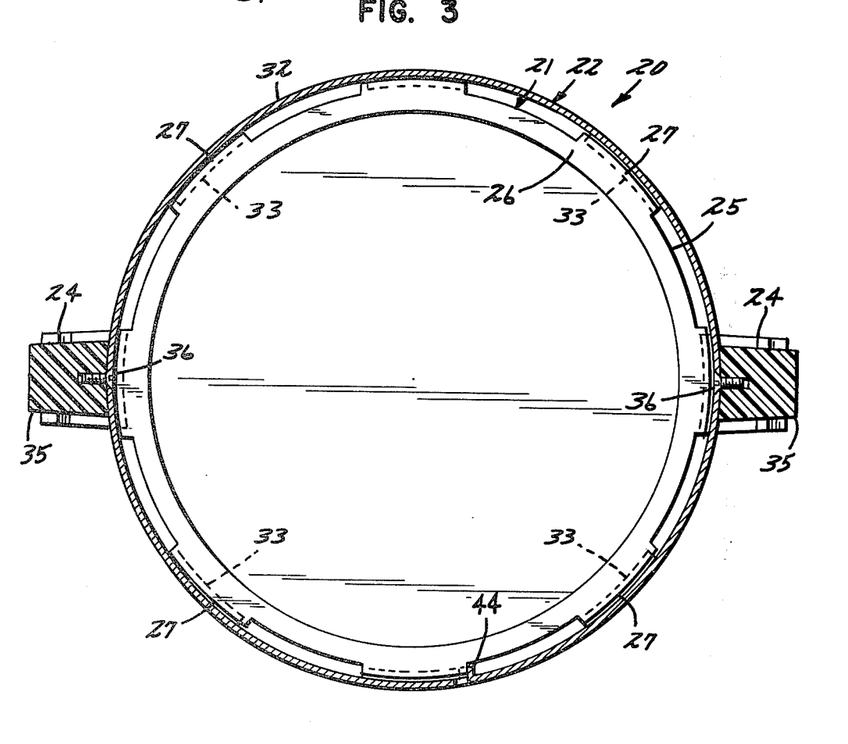
FIG. 3 is a horizontal sectional view taken along the line 3—3 of FIG. 1.
Figure 7:
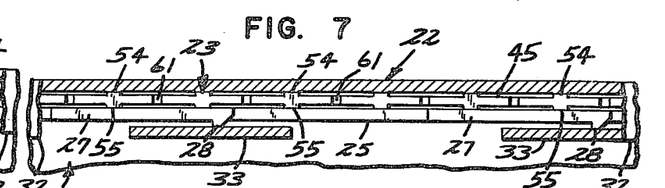
FIG. 7 is a fragmentary view in section generally along the line 7—7 of FIG. 6, showing the cooker in an unlocked condition.

To make the cooker operative it is necessary to next rotate the cover, with respect to the receptacle, in the direction of the arrow 62 in FIG. 2. Stop 44 prevents rotation of the cover in the opposite direction. Handles 35 move from the first, broken line position in which the lugs are disengaged to the second, solid line position in that figure in which the lugs are fully locked. In order to do this, it is necessary to press cover 22 downward against receptacle 21 so that interlock lugs 33 may pass below body stop lugs 28. This forces surface 34 into engagement with ribs 54, and brings ribs 55 into engagement with surface 26, thus compressing leg portions 46 and 47 together and opening passageways above and below the gasket and between the ribs, for the escape of any steam developing in the cooker. This situation is shown in FIGS. 6 and 7. It is noted that the system would work with ribs on only one face of the gasket, but it is preferable to have the ribs on both faces so that the gasket is symmetrical. Further, it is not required that body stop lugs 28 be provided on all interlock lugs 27.

Figure 4:
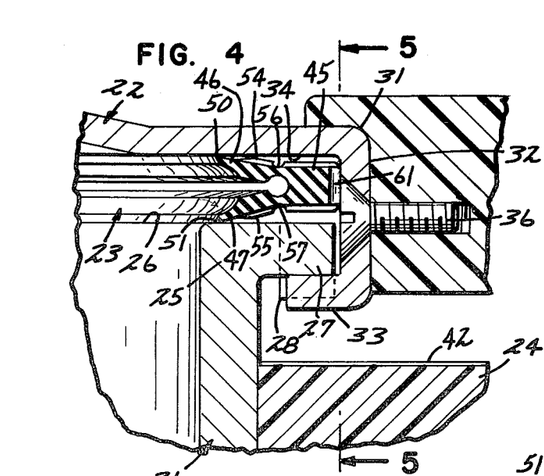
FIG. 4 is a fragmentary sectional view taken along the line 4—4 of FIG. 2 showing the locked condition of the cooker.
Figure 5:
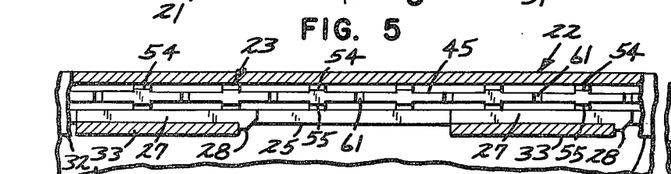
FIG. 5 is a fragmentary view in section generally along the line 5—5 of FIG. 4, showing the cooker in locked condition.

The final step in making the cooker operative is to complete the rotation of cover 22 with respect to receptacle 21 until interlock lugs 33 move past body stop lugs 28, and the cooker achieves the condition shown in FIGS. 4 and 5. Here, in the second, fully locked position, the upper surfaces of lugs 33 engage the principal lower surfaces of lugs 27, and the sapce between sealing surfaces 26 and 34 becomes large enough for gasket 23 to expand legs 46 and 47 so that lips 50 and 51 can engage the sealing surfaces. Now as steam pressure rises in the cooker, lips 50 and 51 are pressed more firmly against surfaces 26 and 34, perfecting a seal to retain steam in the cooker, so that its only escape is by regulator 37, or by plug 38 in the event of regulator failure.

In this second position of the cover it cannot be rotated in the reverse direction because of engagement of the ends of interlock lugs 33 with body stop lugs 28, so that the user cannot inadvertently loosen the cover and release a burst of high pressure steam.

When it is desired to open the cooker heat must be reduced and the contents must be allowed to cool until the pressure in the cooker is substantially atmospheric. The situation is still as shown in FIGS. 4 and 5, but by pressing down on the handles 35 of cover 22, the gasket can be compressed so that lugs 33 can pass under lugs 28, the action resulting in escape passages for any residual steam throughout the spaces between the ribs and through grooves 61. Cover 27 may now be safely removed from the receptacle.

Figures 11, 12, 13:
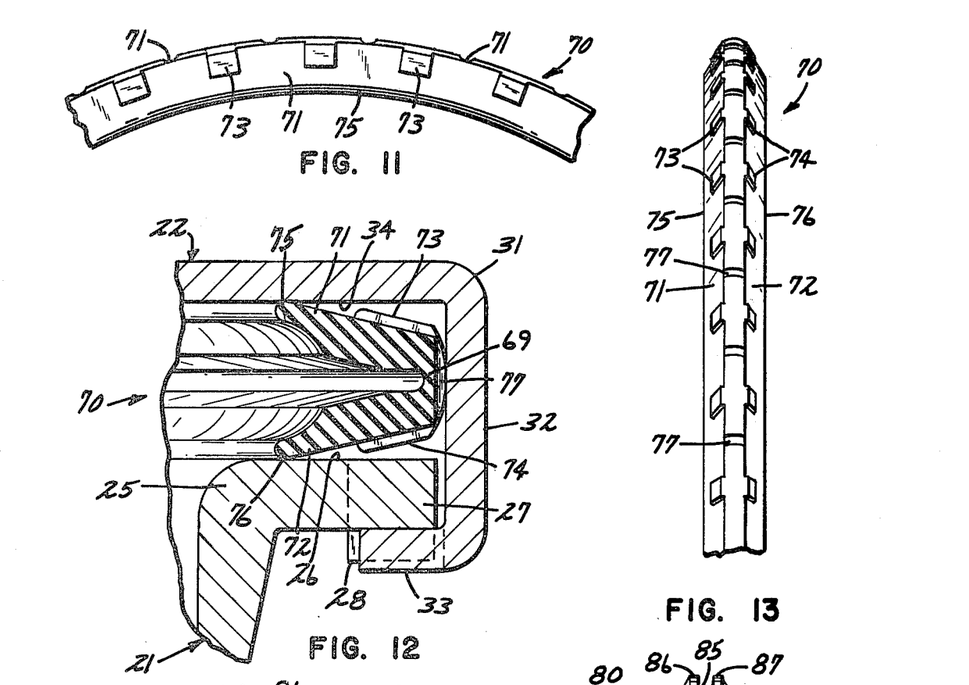
FIGS. 11, 12, and 13 are views like FIGS. 8, 4, and 9, showing a first modified gasket.

An alternative form of gasket is shown at 70 in FIGS. 11–13. Here the section of the gasket radially is generally V-shaped rather than Y-shaped, and has legs 71 and 72 diverging inwardly from a body 69, with bosses or ribs 73 and 74 for coacting with surfaces 34 and 26 respectively to deflect lips 75 and 76 together and out of sealing engagement with the sealing surfaces unless the cover is fully closed, as explained above. A plurality of grooves 77 are provided around the outer periphery of the gasket to afford steam egress passages like grooves 61 of gasket 23. The operation of this gasket is as described above, but the structure affords slightly greater manufacturing tolerances in forming the receptacle and cover.

Figure 14:
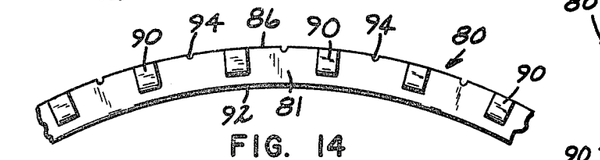
FIGS. 14, 15, and 16 are views like FIGS. 8, 9, and 4, showing a second modified gasket.
Figure 15:
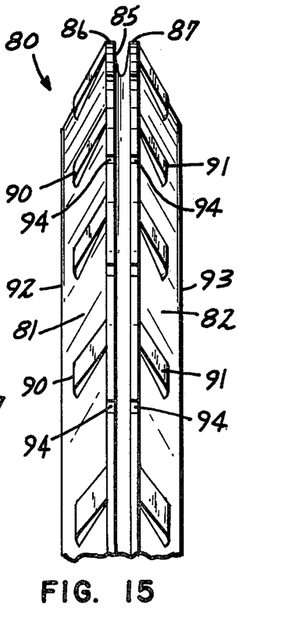
Figure 16:
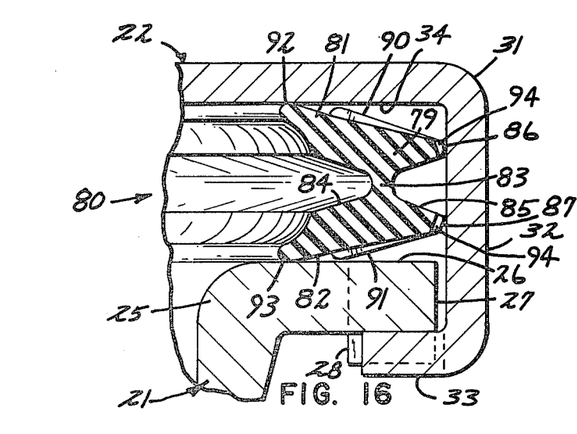

A preferred embodiment of the gasket is shown at 80 in FIGS. 14–16. Here the section of the gasket radially is generally W-shaped rather than Y-shaped or V-shaped, and has legs 81 and 82 diverging inwardly in a body 79 and reiliently interconnected at 83 between an inner groove 84 and an outer groove 85, which divides the body of the gasket into indepentent peripheral ridge portions 86 and 87. Legs 81 and 82 are provided with ribs or bosses 90 and 91, and with sealing lips 92 and 93, and steam escape grooves 94 are provided across portions 86 and 87, between ribs 90 and 91. This gasket configuration is even more accepting of manufacturing tolerances than that of FIGS. 11–13. In all cases, it is preferably that the leg portions of the gasket pivot about a hinge so that movement is predictable. Ribs must be located between the hinge point and sealing lip. The gasket material must be strong enough and the lip conformation such that the lips do not bend back under pressure, which would permit leakage to occur.

The material used in the gaskets is not critical so long as it functions as described above. Preferred materials include Neoprene, Nitrile and Silicone (which is excellent but expensive). A durometer of about 55 on the Shore A range has been successfully used, but again the exact durometer is not critical so long as the overall gasket construction is such that it performs as discussed above. Because sealing occurs at the tips of the leg portions, i.e., at the sealing portions, it would also be possible to use one of the above materials for the legs or tips and another material, such as a polyolefin (polyethylene or polypropylene) for the body. In all cases, of course, the gasket must be constructed of a material that will withstand the operating pressures and temperatures that occur within a pressure cooker.

With regard to the lug arrangement, it should be noted that the body stop lugs 28 have two functions, one being to reduce the disntace between the sealing surfaces with the cover located between the first and second positions to compress the gasket and prevent sealing, and the other being to physically prevent the reverse rotation of the cover with respect to the receptacle after they are in the fully locked position, so long as pressure exists in the unit. In the preferred embodiment, the stop lugs 28 are located on the receptacle lugs, but they could be positioned on the cover lugs as well. In either case, however, the stop lugs should be on the leading edge of all or some of the lugs so that they hold the locking lugs apart for the entire range of movement between the open and fully locked positions. In a cast metal cooker the body stop lugs would normally be cast into the unit but could also be riveted to the unit. In a cooker stamped from wrought aluminum alloy, or stainless steel, the body stop lugs could be swaged or coined during the stamping operation or afterward. The lugs can also be welded to a stainless steel unit.

In the embodiments shown, the locking lugs on the receptacle and on the cover are flat and coplanar. However, the locking lugs could all be tilted at an angle to provide a camming action. This would facilitate closing the unit because the body stop lugs would not initially encounter as much friction.

In addition to providing a high degree of safety, the present invention provides a pressure cooker which is cheaper to manufacture than the prior art cookers because it has fewer parts. Further, the cover is easier to open and close, both because the gasket is so flexible and because it is not necessary to tightly compress the gasket to seal the unit. Another advantage is that the lugs can all be of the same size so that the cover can be placed on the receptacle in any relative position. In existing systems, there is a lever or pin on the cover, or one set of lugs is of a different size, to limit the position of the cover with respect to the body so that the cover can be placed on the body in only one way. In addition to permitting the cover to be placed on the body in any relative position, making the lugs all the same size results in a stronger unit.

From the foregoing it will be clear that the invention comprises a pressure cooker with an improved combination of cover, receptacle, and gasket construction designed to prevent the formation of a steam retaining seal unless and until the cover and receptacle are in a properly locked condition, and to prevent the opening of the cooker from the locked condition until any steam pressuer therein has dropped substantially to ambient.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In a pressure cooker including a receptacle and a cover, safety interlock apparatus comprising:
 (a) said receptacle and said cover having annular sealing surfaces disposed in juxtaposition;
 (b) interlocking lugs on said cover and receptacle, said cover being rotatable with respect to said receptacle in a first direction between a first position in which said lugs are disengaged and a second, fully locked position;

(c) a resilient gasket disposed between said sealing surfaces, said gasket having upper and lower faces and comprising upper and lower inwardly extending, diverging leg portions with inner peripheral sealing lip portions, and said gasket further having space, radially extending ribs formed on at least one of said upper and lower faces;

(d) said interlocking lugs being so constructed and arranged that in the second position of said cover, a first distance between said sealing surfaces is established such that pressure within said pressure cooker can force the leg portions apart with said sealing lip portions pressed into sealing engagement with said sealing surfaces to thereby permit pressure to build up within said cooker; and (e) means associated with at least selected ones of said lugs for reducing the distance between said sealing surfaces with the cover located between said first and second positions to a second distance at which at least one of said sealing surfaces engage said ribs of said gasket to compress said leg portions together and prevent a seal from forming between said lip portions and said sealing surfaces, and for preventing rotation of said cover toward said first position from said second position so long as the distance between said sealing surfaces is greater than said second distance.

2. The pressure cooker of claim 1 including said gasket having an outer peripheral portion with substantially parallel upper and lower faces and having an inner peripheral portion comprising upper and lower inwardly extending annular leg portions with upper and lower faces coextensive with said faces of said outer portion.

3. The pressure cooker of claim 2 wherein said leg portions of said gasket are connected to said outer portion by their connecting portions forming hinges which permit the leg portions to freely pivot without deforming the leg portions.

4. The pressure cooker of claim 2 wherein at least some of said ribs are formed between said hinges and said lip portions of said gasket.

5. The pressure cooker of claim 1 wherein said leg portions of said gasket have inner edges and facing surfaces, and wherein a peripheral part of each leg portion is removed in the area of the converging inner edge and facing surface to define a peripheral lip portion of gradually decreasing thickness which is more pliable than the remainder of said gasket in order to flex agaisnt said adjoining sealing surface.

6. The pressure cooker of claim 1 wherein said gasket comprises a body portion and the inwardly extending leg portions, and wherein said leg portions diverge such that the sealing lip portions are normally spaced apart further than the thickness of said body portion, and wherein said normal spacing is such that the sealing lip portions will engage said sealing surfaces as said surfaces move to said first distance apart.

7. The pressure cooker of claim 1 wherein said means associated with said lugs comprise said lugs on said receptacle each having a leading edge first encountered by said cover lugs upon rotation in said first direction, at least selected ones of said receptacle lugs having an axially extending body stop lug of short peripheral dimension at said leading edge which engages the adjoining surface of said cover lug until the cover reaches the second position, the axial length of said body stop lugs being sufficient to prevent said seal from forming said body stop lugs extending behind said cover lugs with said cover in said second position to prevent reverse rotation of said cover so long as pressure is present in said pressure cooker.

8. In a pressure cooker including a receptacle and a cover, safety interlock apparatus comprising:

(a) said receptacle and said cover having annular sealing surfaces disposed in juxtaposition;

(b) interlocking lugs on said cover and receptacle, said cover being rotatable with respect to said receptacle in a first direction between a first position in which said lugs are disengaged and a second, interlocked position;

(c) an annular gasket with oppositely disposed faces positioned between said sealing surfaces, said gasket comprising upper and lower inwardly extending diverging leg portions with inner peripheral sealing portions, and said gasket further having spaced bosses on at least one of said faces;

(d) said interlocking lugs being so constructed and arranged that in the second position of said cover, a first distance between said sealing surfaces is established such that pressure within said pressure cooker can force the leg portions apart with said sealing portions pressed into sealing engagement with said sealing surfaces to thereby permit pressure to build up within said cooker; and (e) means associated with at least selected ones of said lugs for reducing the distance between said sealing surfaces with the cover located between said first and second positions to a second distance at which at least one of said sealing surfaces engages said bosses on said gasket to prevent a seal from forming between at least one of said sealing portions and said associated sealing surface, and for preventing rotation of said cover toward said first position from said second position so long as the distance between said sealing surfaces is greater than said second distance.

9. The pressure cooker of claim 8 wherein said gasket comprises an integral, resilient member which is symmetrical, having said bosses formed on both said faces.

10. The pressure cooker of claim 9 wherein said receptacle has a radial flange with the said annular sealing surface thereon facing said sealing surface of said cover, and with said lugs being on the periphery thereof, wherein said cover has a depending skirt surrounding the receptacle flange with inwardly projecting lugs formed on said skirt for interlocking engagement with said receptacle lugs, and wherein said gasket is disposed between said sealing surfaces with said outer peripheral portion thereof engaging said skirt.

11. The pressure cooker of claim 9 wherein axial grooves are formed in an edge of a peripheral portion of said gasket facing said skirt to vent trapped air or steam and wherein said bosses are in the form of radially extending ribs which cooperate with said sealing surfaces to hold said sealing portions away from said sealing surfaces during movements of said cover between said first and second positions.

12. In a pressure cooker including a receptacle and a cover, safety interlock apparatus comprising:

(a) said receptacle having an annular sealing surface, and said cover having an annular sealig surface disposed in juxtaposition to said sealing surface on said receptacle;

(b) interlocking lugs on said cover and receptacle, said cover being rotatable with respect to said receptacle in a first direction between a first position in which said lugs are disengaged and a second position in which adjoining surfaces of said lugs are fully aligned, and means for preventing rotation in said first direction beyond said second position;

(c) a resilient gasket disposed between said sealing surfaces, said gasket having a body portion and an inner peripheral portion comprising upper and lower inwardly extending annular leg portions with upper and lower faces and inner peripheral lip portions, said gasket being formed with said leg portions diverging, and said gasket further having spaced, radially extending ribs formed on at least one of said upper and lower faces;

(d) said interlocking lugs being so constructed and arranged that in the second position of said cover, the distance between said sealing surfaces is such that pressure within said pressure cooker can force the leg portions apart with said lip portions pressed into sealing engagement with said sealing surfaces to thereby permit pressure to build up within said cooker; and (e) said lugs on said receptacle each having a a leading edge first encountered by said cover lugs upon rotation in said first direction, at least selected ones of said receptacle lugs having an axially extending body stop lug of short peripheral dimension at said leading edge which engages the adjoining surface of said cover lug until the cover reaches the second position, the axial length of said body stop lugs being such that with the cover located between said first and said second positions at least one of said sealing surfaces engage said ribs on said gasket to compress said leg portions together and prevent a seal from forming between said gasket and said sealing surfaces, and in said second position extend behind said cover lugs to prevent reverse rotation thereof while pressure exists within the pressure cooker.

13. A pressure cooker comprising, in combination:
(a) a receptacle having a flat annular sealing surface;
(b) a cover having a corresponding flat annular sealing surface;
(c) a resilient gasket interposed between said surfaces, said gasket having spaced inwardly extending, annular sealig portions configured to form a seal against said surfaces when they are spaced by a first distance, and including means to prevent formation of such a seal when said surfaces are spaced by a second, smaller distance;
(d) said cover and receptacle having lugs which interlock upon relative roatation thereof to intially establish said second distance; and
(e) means associated with at least selected ones of said lugs for establishing said first distance when the lugs are fully interlocked and for preventing reverse relative rotation of said cover and receptacle from said fully interlocked position so long as a pressurized condition exists in said pressure cooker.

14. The pressure cooker of claim 13 wherein said means to prevent formation of a seal comprises spaced bosses on said gasket facing at least one of said sealing surfaces whereby when said surfaces are spaced by said second distance the bosses engage said surface to hold at least one of said sealing portions away from its associated surface.

15. A resilient, flexible gasket for a pressure cooker, said gasket being annular about an axis and having axially opposite faces, comprising:
(a) a circumferential body portion;
(b) a pair of radially inwardly extending circumferential leg portions which diverge axially to terminate in inwardly peripehral sealing portions;
(c) said gasket being configured to provide hinge means between said leg portions and said body portion whereby said leg portions can be freely pivoted toward each other; and
(d) a plurality of peripherally spaced bosses extending axially from at least one of said faces, said bosses extending discontinuously across said leg portions and said body portion.

16. A resilient, flexible gasket for a pressure cooker, said gasket being annular about an axis and having axially opposite faces, comprising:
(a) a circumferential body portion;
(b) a pair of radially inwardly extending circumferential leg portions which diverge axially to terminate in inwardly peripheral sealing portions;
(c) said gasket being configured to provide hinge means between said leg portions and said body portion whereby said leg portions can be freely pivoted toward each other;
(d) a plurality of peripherally spaced bosses extending axially from at least one of said faces; and
(e) said gasket being Y-shaped in cross section, whereby separate hinge means are provided between said body portion and said leg portions.

17. A resilient, flexible gasket for a pressure cooker, said gasket being annular about an axis and having axially opposite faces, comprising:
(a) a circumferential body portion;
(b) a pair of radially inwardly extending circumferential leg portions which diverge axially to terminate in inwardly peripheral sealing portions;
(c) said gasket being configured to provide hinge means between said leg portions and said body portion whereby said leg portions can be freely pivoted toward each other;
(d) a plurality of peripherally spaced bosses extending axially from at least one of said faces; and
(e) said gasket being W-shaped in cross section, and said body portion comprising a hinge connecting said leg portions.

* * * * *

UNITED STATES PATENT AND TRADEMARK OFFICE
CERTIFICATE OF CORRECTION

PATENT NO. : 4,434,909

DATED : March 6, 1984

INVENTOR(S) : Richard B. Ott

Page 1 of 3

It is certified that error appears in the above-identified patent and that said Letters Patent is hereby corrected as shown below:

INID Code 75, delete "Richrd" and insert --Richard--

Column 1, line 57, delete "becuase" and insert --because--.

Column 1, line 66, delete "structre" and insert --structure--.

Column 2, line 4, delete "recpetacle" and insert --receptacle--.

Column 2, line 6, delete "requireing" and insert --requiring--.

Column 2, line 49, delete "invetnion" and insert --invention--.

Column 2, line 68, delete "asket" and insert --gasket--.

Column 3, line 51, delete "embodoiment" and insert --embodiment--.

Column 4, line 25, delete "when" and insert --When--.

Column 4, line 52, delete "passageways" and insert --passages--.

Column 4, line 66, delete "sapce" and insert --space--.

Column 5, line 39, delete "reiliently" and insert --resiliently--.

Column 5, line 41, delete "indepentent" and insert --independent--.

UNITED STATES PATENT AND TRADEMARK OFFICE
CERTIFICATE OF CORRECTION

PATENT NO. : 4,434,909
DATED : March 6, 1984
INVENTOR(S) : Richard B. Ott

It is certified that error appears in the above-identified patent and that said Letters Patent is hereby corrected as shown below:

Column 5, line 47, after "FIGS. 11-13.", begin a new paragraph.

Column 5, line 48, delete "preferably" and insert --preferable--.

Column 6, line 3, delete "disntace" and insert --distance--.

Column 6, line 51, delete "pressuer" and insert --pressure--.

Column 7, line 52, delete "agaisnt" and insert --against--.

Column 8, line 68, delete "sealig" and insert --sealing--.

Column 9, lines 4-5, delete "recpetacle" and insert --receptacle--.

UNITED STATES PATENT AND TRADEMARK OFFICE
CERTIFICATE OF CORRECTION

PATENT NO. : 4,434,909
DATED : March 6, 1984
INVENTOR(S) : Richard B. Ott

It is certified that error appears in the above-identified patent and that said Letters Patent is hereby corrected as shown below:

Column 9, line 50, delete "sealig" and insert
--sealing--.

Column 9, line 56, delete "roatation" and insert
--rotation--.

Signed and Sealed this

Fourth Day of December 1984

[SEAL]

Attest:

GERALD J. MOSSINGHOFF

Attesting Officer  Commissioner of Patents and Trademarks